Sept. 29, 1959 A. SVOBODA 2,906,458

DECIMAL RELAY ADDING MACHINE

Filed Nov. 8, 1954 3 Sheets-Sheet 1

INVENTOR.

Antonin Svoboda

BY

Richard ... Ag't

Sept. 29, 1959 A. SVOBODA 2,906,458

DECIMAL RELAY ADDING MACHINE

Filed Nov. 8, 1954 3 Sheets-Sheet 2

INVENTOR.
Antonín Svoboda
BY Richard [signature]
Agt.

DECIMAL RELAY ADDING MACHINE
Filed Nov. 8, 1954 3 Sheets-Sheet 3
FIG. 3
| | |
|---|---|
| 0 | 0 |
| 1 | 4 -2 -1 |
| 2 | 4 -2 |
| 3 | 4 -1 |
| 4 | 4 |
| 5 | 8 -2 -1 |
| 6 | 8 -2 |
| 7 | 8 -1 |
| 8 | 8 |
| 9 | 8 4 -2 -1 |
FIG. 4
| | | | | |
|---|---|---|---|---|
| 0 | 0 | 0 | 0 | 0 |
| 1 | 0 | 1 | 1 | 1 |
| 2 | 0 | 1 | 1 | 0 |
| 3 | 0 | 1 | 0 | 1 |
| 4 | 0 | 1 | 0 | 0 |
| 5 | 1 | 0 | 1 | 1 |
| 6 | 1 | 0 | 1 | 0 |
| 7 | 1 | 0 | 0 | 1 |
| 8 | 1 | 0 | 0 | 0 |
| 9 | 1 | 1 | 1 | 1 |
FIG. 5
| | | | | |
|---|---|---|---|---|
| 0 | 1 | 1 | 1 | 1 |
| 1 | 1 | 0 | 0 | 0 |
| 2 | 1 | 0 | 0 | 1 |
| 3 | 1 | 0 | 1 | 0 |
| 4 | 1 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 0 | 0 | 0 | 0 |
FIG. 6
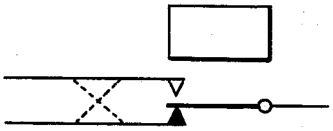
FIG. 7
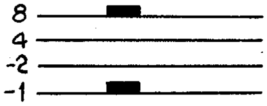
FIG. 8
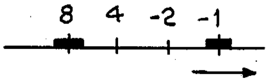
FIG. 9
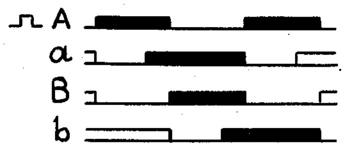
FIG. 10
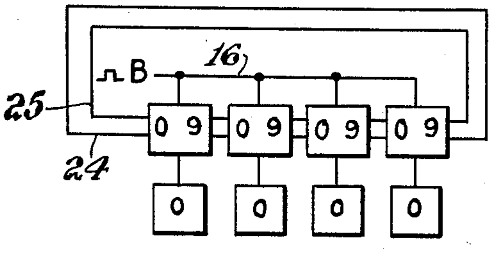
INVENTOR.
Antonín Svoboda
BY Richard Low
Ag't United States Patent Office 2,906,458
Patented Sept. 29, 1959

2,906,458

DECIMAL RELAY ADDING MACHINE

Antonín Svoboda, Prague, Czechoslovakia, assignor to Aritma, narodni podnik, Prague, Czechoslovakia, a company of Czechoslovakia Application November 8, 1954, Serial No. 467,549

Claims priority, application Czechoslovakia November 6, 1953

3 Claims. (Cl. 235—174)

Figure 1:
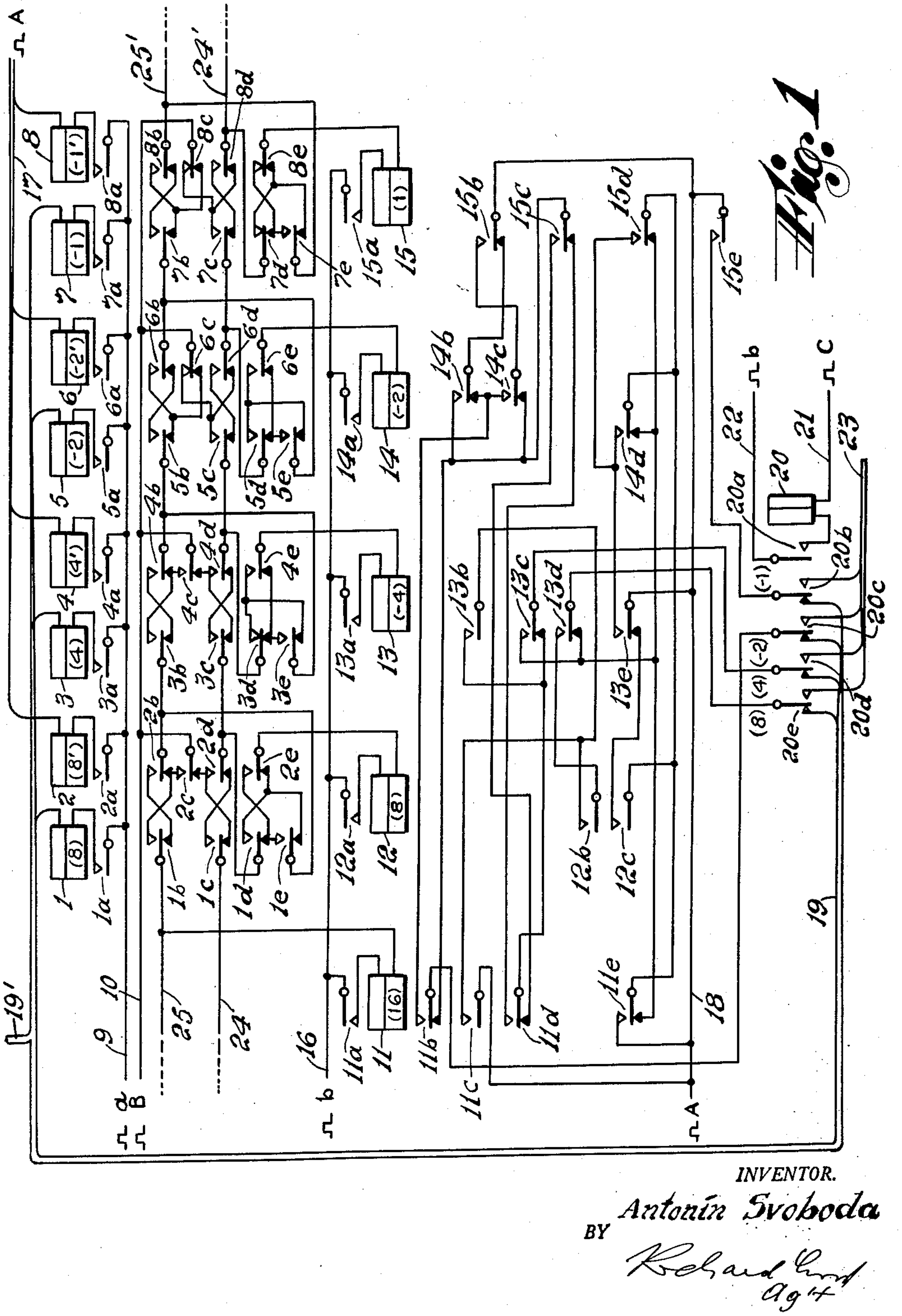

In mathematical digital computers wherein the computing operation is performed in a purely electrical way, either through electronic valves or by means of electromagnetic relays, all the operations are carried out mostly in a duel system or in a binarily ciphered decimal system. Each digit of a binary number can be indicated by the presence or absence of voltage at a corresponding place in an electric network. Thus, each decimal number can be expressed in itself by the corresponding binary number, such number being referred to as a binaryily coded decimal number. Therefore, it is possible to represent, in a parallel system, each digit of a decimal number by four wires or terminals whereon the voltages correspond to the digits $2^3$, $2^2$, $2^1$, $2^0$ (i.e. in the binary system 8, 4, 2, 1), so that their combinations enable each digit from zero to nine to be represented. Thus, e.g. the decimal digit 7 is expressed in the binary code by a voltage on the terminals 4, 2, 1 while the terminal 8 is without voltage. In a serial system a single conductor is provided for each digit of the decimal number, and electric pulses run at regular intervals through that conductor, a group of four successive electric pulses indicating one binarily coded decimal number or digit.

The conversion of the digits of the decimal numbers into the binarily coded system is performed in a decoder having exit terminals, from which pulses representing the binarily coded image of the original digit are obtained. With the numbers thus decoded, further operations are carried out, that is, these coded numbers are transmitted either positively or negatively; a positive transmission involving the selection of the nine complement of the decimal number. In order to enable a negative operation to be carried out, the complement of each decimal digit may be decoded simultaneously with the digit by means of an additional decoder for each digit/place/order, or the binary code may be such as to give the complement of the decimal number by simple inversion of the binary code digits.

With the numbers thus decoded, further arithmetic operations are carried out in further devices, mostly in adding devices and accumulator devices, the intricacy or simplicity of such devices depending chiefly on the convenience of the code in use.

With the use of the code 8, 4, −2, −1, the exit terminals of the decoder always present simultaneously the coded images of both the number and its complement. This code is not purely binary, but offers the substantial advantage over a genuinely binary code, for example, the 8, 4, 2, 1 system, of presenting at the exit terminals both the coded representation of the digit fed to the input and the complement of the decoded digit. This modification of the binary code presents further advantages. The code itself is complementary so that building up of the complement is very easy. Moreover, the use of this code enables the simplest possible electric network to be set up, so that the adding device is very simple. Such an adding device is characterised by the simplicity of its tens transfer for which no particular transfer cycle need be provided so that the adding machine is not slowed down in its operation by the time required for a tens transfer cycle. Such advantageous speeding up of the operation of the adding device embodying this invention results from the provision at its input of two groups of two-winding electromagnetic relays to which the same electrical pulses, representing both a digit and the complement of that digit, respectively, are simultaneously supplied, the contacts of such input relays and the other elements for each order or place of the decimal number being inter-connected by first and second conductors in an arrangement effective to cause an image of the result with the tens transfer to be imposed on such conductors immediately after the electrical pulses from the decoder have been supplied to the input of the adding device and so that, when the result is taken up by a reading pulse, the reading pulse passes only through the first inter-connecting conductor, in cases where the total numerical value at a lower order does not exceed the digit 9, and through the second inter-connecting conductor, in cases where the total numerical value at the lower order exceeds the digit 9.

A further feature of such adding machines is the stabilized zero cipher which means that zero and the complement of zero are built up genuinely as zero and not as the complement thereof, i.e. a series of nines, as is the case with other codes. Use is made of the foregoing as follows: the reading pulse does not pass over the contacts of the input relays if the numerical value represented by the condition of the input relays is zero or if the inputs to the adding device represent a digit and the complement of that digit, respectively, and, in the latter case, both inter-connecting conductors are included in a closed circuit with the contacts for all orders within the adding device.

A still further feature of the adding device embodying this invention is the employment of a five-pointed code (16, 8, −4, −2 and 1) for the transportation of the results by the reading pulse from contacts of the input relays to contacts of output relays.

The following detailed description refers to an embodiment of the present invention given merely by way of example, which has a parallel system with electromagnetic relays, but it is to be understood that other applications of the invention are possible. Thus, the 8, 4, −2, −1 code can be used both in parallel and serial systems employing either electronic valves, electromagnetic relays or mechanical means.

Figure 2:
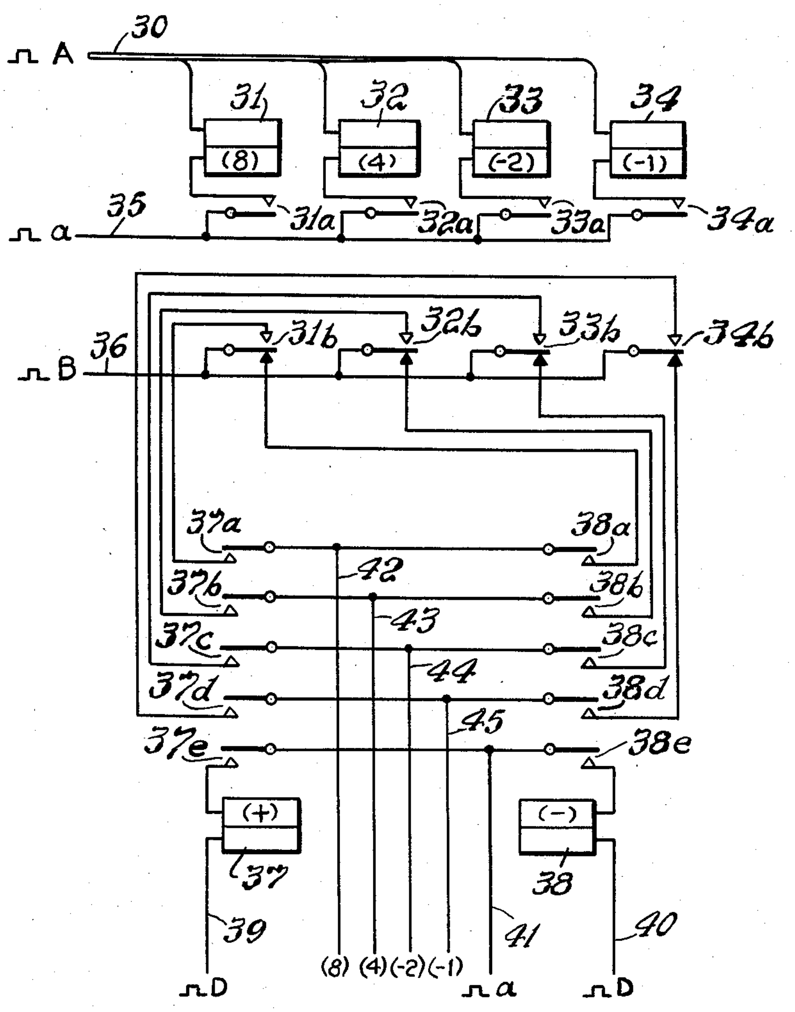

Further objects and features of the present invention will be obvious from the following description which is to be read with reference to the accompanying drawings, wherein:

Fig. 1 is a wiring diagram which illustrates an accumulator device embodying this invention; Fig. 2 shows diagrammatically the relay memory; Fig. 3 is a chart of the code used; Figs. 4 and 5 represent the signal constituents of the individual decimal digits and their complements, respectively, when using this code; Fig. 6 illustrates an electromagnetic relay with one change-over contact, the wiring of the contacts being indicated in dotted lines, for converting the code according to the chart shown in Fig. 4 into the code represented in Fig. 5; Fig. 7 illustrates the entering of the digits in a parallel system; Fig. 8 illustrates the entering of the digits in a serial system; Fig. 9 illustrates the timing of a system of working and holding electric pulses; and Fig. 10 illustrates diagrammatically a four-place adding device wherein at the one entrance there is introduced the coded representation of a decimal digit, for example, the number 9, and at the other entrance there is introduced its complement, for example, the number 0 which is the negative form of the same number, and their sum at the exit appears as zero.

An outstanding feature of mathematical digital computers embodying the present invention is the use therein of a complementary code 8, 4, −2, −1 for expressing all decimal digits. By means of this code any decimal digit can be expressed, as is indicated in the chart of Fig. 3 as a sum of the values of the respective digits of the code.

In an electric parallel system, each decimal digit is binarily coded and represented by a voltage on one or more conductors out of four conductors designed for each decimal order or place.

Fig. 4 gives a chart indicating for each decimal digit the corresponding signal components for expressing this digit in the code used, by means of a voltage on one or more conductors out of the four conductors corresponding to the related decimal order. Each decimal digit is transferred into a four-place group built up of merely two different symbols "0" and "1." The symbol "0" indicates that there is no voltage in the respective conductor while the symbol "1" indicates a voltage occurring in the respective conductor. A thorough examination of Fig. 5 makes it clear that the nine complement of any digit is expressed by the very opposite state of the conductors than the original digit, i.e. those conductors which are under voltage for expressing the respective digit, are voltage-free when expressing the complement of this digit and vice versa. The chart of Fig. 5 gives the electrical signal components for each decimal digit in the code used, which are just opposite those given in the chart of Fig. 4. Thus, the digit "1" can be represented by voltage in the second, third and fourth conductors, as in Fig. 4, or by voltage only in the first conductor, as in Fig. 5. Both these charts, and the respective codes are equivalent, as by a permanent change-over of the contacts, as indicated in dotted lines in Fig. 6, one code can be converted into the other.

In a parallel electric system, electric pulses for each individual order of the decimal number are sent out simultaneously over the corresponding conductors out of four conductors in accordance with the magnitude of the digit, as is indicated in Fig. 7 which shows the digit 7 being sent. The horizontal lines indicate the conductors for the code 8, 4, −2, −1 the blacked rectangles indicate the electric pulses or wires carrying a voltage when transmitting the digit 7.

Fig. 8 illustrates the transmission of the decimal digit 7 in the code used when employing a serial system. There is a single conductor for each individual order or place of the decimal number, and four successive intervals represent each digit, with pulses being transmitted only during certain intervals of each group of four intervals in accordance with the code. The voltages on the electric conductors or the electric pulses are controlled by an apparatus called a pulse generator. The pulse generator consists of a system of cams which on their rotation close and open contacts for a precisely determined period thus building up and releasing into the electric network electric pulses of a suitable length.

In order to illustrate clearly the advantage of the code employed, Fig. 2 shows a diagram of an element of the relay memory, i.e. a memory for one decimal digit. With this memory it will be illustrated, how in the case of the described complementary code it is possible to take up from the memory the number entered and to transfer it further as needed either positively or negatively. The memory is an organ wherein the numerical image of an augend, addend, minuend or subtrahend can be stored for a determined period and taken up therefrom as required during this period. The illustrated memory has four two-winding relays 31, 32, 33, 34 corresponding to the values 8, 4, −2, −1 of the employed binary system. These relays are illustrated as rectangles each with a horizontal line across the middle for indicating that the relay has two windings. One of the windings of each relay (the upper winding in Fig. 2) is connected to an electric network 30, through which the number is transmitted into the memory as an electric pulse A, normally by way of the contacts of other relays and; the other end of this upper winding is connected permanently together with one end of the other or lower winding to the positive pole of a D.C. voltage source (not illustrated). The other or lower winding of each relay is connected by way of a connecting contact 31*a*, 32*a*, 33*a* or 34*a* of the relay to a conductor 35 receiving the holding pulse *a* directly from the pulse generator. These entrance relays 31, 32, 33 and 34 are two-contact relays, the contacts 31*a*, 32*a*, 33*a* and 34*a* being the connecting contacts, as explained above, and the contacts 31*b*, 32*b*, 33*b* and 34*b* being change-over contacts. In Fig. 2, the fixed contacts which are closed upon energization of the relay are indicated by a white triangle, while the fixed contacts which are closed upon deenergization of the relay are indicated by a blacked triangle. The exit from the memory is controlled by two electromagnetic relays 37 and 38 which also have two windings but are each provided with five connecting contacts 37*a*, 37*b*, 37*c*, 37*d* and 37*e*, and 38*a*, 38*b*, 38*c*, 38*d* and 38*e*, respectively.

The above described relays are fed by a system of electric pulses permitting utilization of the full working speed of the relays with sparkless closing and opening of the contacts. Such a system produces four kinds of electric pulses, in the time sequence represented by the diagram shown in Fig. 9.

The basic pulses are those indicated by A and B, the so-called working pulses which are of equal length and mutually complementary. These pulses are completed by holding pulses *a* and *b* in such a way that a relay energized by the pulse A is held in this condition by the pulse *a* for such a period that just one pulse B can pass the closed contacts of the relay held in its energized condition. In a similar way, a relay energized by the pulse B is held by a pulse *b* for such a period that a pulse A is just able to pass through its closed contacts. The length of the pulses A and B is chosen so as to exceed somewhat the period required for the relay to be attracted and to fall off, respectively. The pulses A and B feed the working windings of the relays, while the pulses *a* and *b* feed the holding windings of the relays. The pulses A, B, *a*, *b* are produced in the pulse generator which is the only place where the current is connected and disconnected. All contacts of the relays are either closed or opened at a time when no current passes therethrough, thus preventing the occurrence of any sparking.

These two-winding relays behave in such a manner that any change of current in one winding induces a voltage in the second winding. When the circuit of the second winding is closed in whatever manner, a current can pass therethrough bringing about a delay in the falling off of the respective relay, that is, movement of the latter to its deenergized condition or an undesirable attraction of another relay. This might cause a reduction of the operating speed and of the efficiency and reliability of the whole device using such relays. Therefore, it is preferable to employ the timing sequence of Fig. 9, wherein the pulse B ends before the end of holding pulse *a* and therefore before the movement of the relay to its deenergized condition.

Referring to Fig. 2 in detail, it will be seen that the working windings of relays 31, 32, 33 and 35 are energized by the pulse A transmitted through the wire 30, while a holding pulse *a* can pass through wire 35 and the closed holding or connecting contact 31*a*, 32*a*, 33*a* or 34*a* following energization of the related relay so that the number entered in the memory by the pulse A into the memory is stored in the memory for the duration of the holding pulse *a*, which retains the relay in its energized condition, even if the working pulse A has already ceased. The coded image of the number entered in the memory according to the code 8, 4, −2, −1 is represented by those of the relays 31, 32, 33 and 34 which are attracted or in their energized condition. During the pulse *a* which holds a previously energized relay in that condition, it is possible to take the coded number out of the memory by a pulse B. Pulse B comes through the wire 36 and passes on through the change-over contacts 31*b*, 32*b*, 33*b* and 34*b* of the entrance relays 31, 32, 33 and 34 to the contacts of the relay 37 or the contacts of the relay 38.

The contacts 37*a*, 37*b*, 37*c* and 37*d* of relay 37 are connected to the fixed contacts or connect sides (represented by white triangles) of the change-over contacts 31*b*, 32*b*, 33*b* and 34*b*, respectively, which are closed only when the corresponding relays 31, 32, 33 and 34 are energized, while the contacts 38*a*, 38*b*, 38*c* and 38*d* of the relay 38 are connected to the fixed contacts or disconnect sides (represented by black triangles) of the change-over contacts 31*b*, 32*b*, 33*b* and 34*b*, respectively, which are closed only when the corresponding relays are in their deenergized conditions, as shown in Fig. 2.

The contacts 37*e* and 38*e* of relays 37 and 38 are holding contacts and are connected to one of the windings of the related relays and to a conductor 41 which transmits the holding pulse *a*. The relays 37 anhd 38 form a lock and control the exit out of the memory. The relays 37 and 38 are initially energized by pulses D received through wires 39 and 40 from a suitable control device (not shown). Thus, the relays 37 and 38 can be selectively energized by pulses D acting in their lower windings (as viewed in Fig. 2) which are connected to wires 39 and 40 and, thereafter, the energized relay is held in its energized condition by a holding pulse *a* transmitted by wire 41 to the hold winding (which is the upper winding in Fig. 2). The movable contacts 37*a*–37*d* and 38*a*–38*d* of the exit relays 37 and 38 corresponding to the same entrance relays are interconnected, and wires 42, 43, 44, and 45 lead from these connections. It will be apparent that, when a pulse B is transmitted through wire 36 while the holding pulse *a* holds one or more selected entrance relays in the energized condition, the pulse B is transmitted to the contacts of relay 37 corresponding to the selected entrance relays 31, 32, 33 or 34 which are in energized condition, and the pulse B is also simultaneously transmitted to the contacts of relay 38 corresponding to those entrance relays which were not energized and which represent the coded complement of the coded digit represented by the energized entrance relays. When the number is to be taken up from the memory positively, the relay 37 is energized by a pulse D which is transmitted by the wire 39 before the pulse B is transmitted to contacts of relay 37 by way of the change-over contacts of the energized entrance relays, thereby to prevent sparking at the contacts of relay 37 when the latter is energized. When the contacts of relay 37 close, the pulse B passes over those closed contacts corresponding to one or more of the entrance relays 31, 32, 33 or 34 which have been energized and into one or more of the corresponding wires 42, 43, 44, 45. When the number is to be negatively sent out of the memory, that is, when the coded complement of the coded number introduced by the pulse A is to be transmitted, the relay 38 is energized. Each of the exit relays 37 and 38, after being energized, is held in that condition by the pulse *a* transmitted to its holding contact 37*e* or 38*e* through the wire 41.

If, e.g. the digit 7 is entered into the memory, the entrance relays 31 and 34 are energized by a pulse A and are held by the holding pulse *a* in an energized condition. Thus, the movable contacts of the change-over contacts 31*b* and 34*b* are displaced to engage the fixed contacts represented by white triangles. If, thereupon, a pulse B passes through the wire 36, such pulse is transmitted by the contact 31*b* of the relay 31 and by the contact 34*b* of the relay 34 to the respective contacts 37*a* and 37*d* of the relay 37. At the same time, the pulse B is also transmitted by contact 32*b* of the relay 32 and by contact 33*b* of the relay 33 to the contacts 38*b* and 38*c* of the relay 38. In other words, the pulse B is simultaneously transmitted to those contacts of the relay 37 which correspond to the coded digit introduced into the memory, that is, the digit "7," and also to those contacts of the relay 38 corresponding to its coded complement, that is, the digit "2." If, for example, the number is to be sent out of the memory positively, the relay 37 is already energized by the pulse *D* so that the pulse *B* is transmitted over closed contacts 37*a* and 37*d* to the exit wires 42 and 45, while the wires 43 and 44 are voltage-free. After the completion of the holding pulse *a*, the entrance relays 31 and 34 are deenergized and the memory is again clean.

The top part of Fig. 1 illustrates diagrammatically the relay adding device for one place or order of a decimal number which is represented in terms of the code 8, 4, —2, —1.

The adding device is an apparatus receiving information about all addends simultaneously and converting the same into information about the result. The adding device according to the present invention has two entrances and is therefore capable of simultaneously receiving two addends. The illustrated adding device includes entrance relays 1, 2, 3, 4, 5, 6, 7 and 8 and relays 11, 12, 13, 14, and 15 where the result appears, but obviously in another code. This result giving code is a five-place code, the individual places having the numerical significance of 16, 8, —4, —2, 1 so that it can represent the sum of any two digits introduced at the two entrances of the adding device. To enable the result to be further treated in the original code, that is, 8, 4, —2, —1, it is necessary to re-transform the code 16, 8, —4, —2, 1 and for this purpose the relays 11 to 15 are provided with a suitable number of contacts which are interconnected in such a way, as hereinafter described, as to form an electric network with four outlets through which the sum is emitted in the code 8, 4, —2, —1 and those four outlets are connected to the movable contacts of contacts 20*b*, 20*c*, 20*d* and 20*e* of an exit relay 20 which can release the result into the line 19 connected to the disconnect sides of contacts 20*b*—20*e* or the line 23 attached to the connect sides of such contacts. The relays 11 to 15 have holding contacts 11*a*, 12*a*, 13*a*, 14*a* and 15*a* so as to form a memory. Further, relay 11 has a normally open contact 11*c* and contacts 11*b*, 11*d* and 11*e* with normally open connect sides (white triangles) and normally closed disconnect sides (black triangles). Relay 12, in addition to its hold contact 12*a*, has two normally open contacts 12*b* and 12*c* which are closed in response to energizing of the related relay. Relay 13 also has a normally open contact 13*b*, and three contacts 13*c*, 13*d* and 13*e* which have normally closed disconnect sides and normally open connect sides. Relay 14 also has three contacts 14*b*, 14*c* and 14*d* which have normally closed disconnect sides and normally open connect sides, and relay 15 has a normally open contact 15*e* and three contacts 15*b*, 15*c* and 15*d* with normally closed disconnect sides and normally open connect sides.

It will also be seen that each of the two-winding relays 1, 2, 3, 4, 5, 6, 7 and 8, has a normally open holding contact 1*a*, 2*a*, 3*a*, 4*a*, 5*a*, 6*a*, 7*a* and 8*a* respectively. Further, each of the entrance relays includes four contacts, for example, the contacts 1*b*, 1*c*, 1*d* and 1*e* of relay 1, and such contacts have a normally closed disconnect side (represented by a black triangle) and a normally open connect side (represented by a white triangle).

As is apparent in Fig. 1, all of the holding contacts 1*a*—8*a* are connected to a wire 9 for transmitting a holding pulse *a*, while the holding contacts 11*a*—15*a* are connected to a wire 16 for transmitting a holding pulse *b*.

A wire 10 for transmitting a pulse B is connected to the movable contact or spring of the contacts 2*c*, 4*c*, 6*c* and 8*c* of relays 2, 4, 6 and 8, respectively.

A wire 25 is connected to the movable contact of contact 1*b* and to the actuating winding, as distinguished from the hold winding, of relay 11, while a wire 24 is connected to the movable contact or spring of contact 1*c*. The connect and disconnect sides of contacts 1*b*, 1*c* and 1*d* are connected to the disconnect and connect sides, respectively, of the contacts 2*b*, 2*d* and 2*e*. The spring of contact 1*d* is connected to the spring of contact 2*d*, while the spring of contact 1*e* is connected to the springs of contacts 2*b* and 3*b*. The disconnect side of contact 1*e* is connected to the disconnect side of contact 2*e*, while the connect side of contact 1*e* is connected to the disconnect side of contact 1*d*. Further, the connect and disconnect sides of contact 2*c* are connected to the disconnect side of contact 2*b* and to the connect side of contact 2*d*, respectively.

The movable contacts or springs of contacts 2*e*, 4*e*, 6*e* and 8*e*, are connected to the actuating windings of relays 12, 13, 14 and 15, respectively.

The springs or movable contacts of contacts 3*d*, 5*d* and 7*d* are connected to the springs of contacts 4*d*, 6*d* and 8*d*, respectively, while the spring of contact 3*e* is connected to the springs of contacts 4*b* and 5*b*, and the spring of contact 5*e* is connected to the springs of contacts 6*b* and 7*b*. The springs of contacts 2*d*, 4*d* and 6*d* are connected to the springs or movable contacts of contacts 3*c*, 5*c* and 7*c*, respectively. The connect sides (represented by white triangles) and the disconnect sides (represented by black triangles) of contacts 3*b* and 3*c* are connected to the disconnect and connect sides, respectively, of contacts 4*b* and 4*d*, while the connect and disconnect sides of contact 4*c* are connected to the disconnect side of contact 4*b* and to the connect side of contact 4*d*, respectively. Further, the connect and disconnect sides of contact 3*d* are connected to the connect and disconnect sides, respectively, of contact 4*e*, while the connect and disconnect sides of contact 3*e* are connected to the disconnect and connect sides, respectively, of both contacts 3*d* and 4*e*.

Similarly, the connect and disconnect sides of contact 5*e* are connected to the disconnect and connect sides, respectively, of both contacts 5*d* and 6*e*, while the connect and disconnect sides of contacts 5*b* and 5*c* are connected to the disconnect and connect sides, respectively, of contact 6*b* and af contact 6*d*. It will also be seen that the connect side of contact 6*c* and the disconnect side of contact 6*c* are connected to the connect side of contact 5*c*, and to the disconnect side of contact 5*b*, respectively.

Further, as shown in Fig. 1, contacts 7*b* and 7*c* of relay 7 and contacts 8*b*, 8*c* and 8*d* of relay 8 are mutually connected in the same manner as has been described above with reference to contacts 5*b* and 5*c* of relay 5 and contacts 6*b*, 6*c* and 6*d* of relay 6. It will also be apparent that the connect and disconnect sides of contact 7*d* are connected to the disconnect and connect sides, respectively, of contact 8*e*, and that the connect and disconnect sides of contact 7*e* are connected to the connect and disconnect sides, respectively, of contact 8*e*.

A wire 25 is connected to the springs or movable contacts of contacts 8*b* and 7*e*, and a wire 24' is connected to the spring of contact 8*d*.

Contact 11*c* of relay 11, the connect side of contact 11*e*, the spring of contact 13*e*, contact 15*e* and the spring of contact 15*b* are connected, in parallel, with a wire 18 for transmitting a pulse A. The connect and disconnect sides of contact 15*b* are connected to the springs of contacts 14*c* and 14*b*, respectively, while the connect and disconnect sides of contacts 14*b* and 14*c*, respectively, are connected together and to the disconnect side of contact 11*b*. The disconnect and connect sides of contacts 14*b* and 14*c*, respectively, are also connected to each other and are further connected to the connect side of contact 11*b*, and the spring of contact 11*b* is connected to the spring of contact 20*c* of relay 20 which corresponds to "—2" in the exit code.

The contact 15*e* is directly interposed between wire 18 and the spring of contact 20*b* corresponding to "—1" of the exit code.

The springs of contacts 13*c* and 13*d* are connected to the springs of contacts 20*d* and 20*e*, respectively, which correspond to "4" and "8" of the exit code.

The springs of contacts 14*d* and 15*d*, and contact 12*c* are connected in parallel with the spring of contact 11*e*, and the disconnect side of contact 15*d* is connected with the connect sides of contacts 14*d* and 13*e*, while the connect side of contact 15*d* is connected with the disconnect sides of contacts 11*e*, 13*d* and 14*d* and with the connect side of contact 13*c*. Further, contact 12*c* is connected with the disconnect side of contact 13*e*.

The spring of contact 11*d* is connected to the disconnect side of contact 13*c* and, by way of contact 13*b*, to the contact 11*c*. The connect and disconnect sides of contact 11*d* are connected to the disconnect and connect sides, respectively, of contact 15*c*, and the spring or movable contact of the latter is connected to the disconnect side of contact 14*c*. Further, the connect side of contact 13*d* is connected, by way of contact 12*b*, to the contact 11*c*.

The holding pulse *b* is fed from a wire 22 to the hold winding of relay 20 by way of a hold contact 20*a* of the latter, and the relay 20 is initially energized by a pulse C fed from a wire 21 to the actuating winding of the relay.

It will be understood that the above described arrangement of the contacts of relays 11, 12, 13, 14 and 15, other than their holding contacts, form a decoder for converting the result from the 16, 8, —4, —2, 1 code represented by such relays into the exit code 8, 4, —2, —1, while the relay 20 forms an exit switch for determining when, and in what form, the coded result will be released.

Such combination of an adding device, memory and decoder results in the formation of an accumulator, i.e. a device for receiving successive addends in coded form, each addend being added to the sum of all the previously introduced addends.

The right hand entrance of the adding device is formed by a line 17 extending from a memory or from a keyboard and through which a pulse A representing a number is passed to one or more of the relays 2, 4, 6, 8. The left-hand entrance of adding device is formed by the line 19 through which a pulse A can pass from one or more of the contacts of relay 20, representing the sum of previously introduced addends, to one or more of the corresponding relays 1, 3, 5 and 7, and by a line 19' branching into line 19 and extending from another memory or keyboard. Thus, lines 17 and 19 make it possible to simultaneously introduce to the adding device an addend and an accumulated sum, while lines 17 and 19' make possible the simultaneous introduction of two addends. Thus it is possible, by steadily adding the results of an addition to the original number to obtain the double, triple, quadruple or other multiple of that number. For example, if a first number is entered by a pulse A, in line 17, the immediately following pulse B adds that number to zero on the left-hand entrance and the result is sent through line 19 by the next pulse A in line 18 to the left entrance, while the same pulse A in line 17 again introduces the original number to the right-hand entrance, and the following pulse B adds the numbers introduced at the left and right entrances, thus giving the double of the original number. This result is sent again to the left-hand entrance, and the original number is again introduced at the right-hand entrance so that, when both numbers are added, the result is triple the original number. The relay 20 energized by a pulse C in wire 21, and being held by a pulse *b* in wire 22 forms a switch controlling the exit from the adding device and determining whether the sum is sent to the left-hand entrance through the line 19 or is passed through the line 23 out of the adding device. The pulse C for actuating the relay 20 is generated in a suitable control device (not shown).

Obviously, if a pulse A representing a digit is sent through the wire 17 to the right-hand entrance and, at the same time, a pulse A representing another digit is sent to the left-hand entrance through the wire 19′ from the associated memory or keyboard (not shown), their sum comes out at the exit.

For the individual places or orders of a decimal number, the elements of the adding device are of the same design as that described above, each element being connected to the adjacent element corresponding to the next higher order through the wires 24 and 25, and to the adjacent element corresponding to the next lower order by the wires 24′ and 25′. A pulse B from a lower order to the next higher order always passes through wire 24, if the sum of the digits of the lower order does not exceed the figure nine; while the pulse B passes from a lower order to the next higher order through the wire 25, if the sum of the digits in the lower order exceeds the value 9 and thereby automatically increases by a unit the sum or result detained in the element of the higher order. Conditions for this tens transfer are created upon energization of the entrance relays, and the tens transfer is effected by a pulse B simultaneously with the addition of the numbers introduced at both entrances of the adding device so that it needs no additional transfer cycle.

The functioning of the adding device as shown in Fig. 1 will now be described with reference to several examples. If 8+1 are to be added, the result does not exceed the value of 9 so that no pulse is to pass into the transfer wire 25 leading to a higher order, but only into the wire 24. The digit "8" is introduced at the left-hand entrance and only the relay 1 will be energized, while the digit "1" is introduced at the right-hand entrance, and, accordingly, the relays 4, 6, 8 will be energized. The relays 1, 4, 6 and 8 are initially energized by pulses A from lines 19′ and 17 and held in energized condition by a pulse *a* in line 9. All the contacts belonging to the relays 1, 4, 6 and 8 are turned over. The pulse B for adding the digits "8" and "1" is received through the wire 10 and passes through the contact 2*c* of deenergized relay 2 to the disconnect side of the contact 1*c* of the relay 1, but, since the latter is energized, the movable contact moves away from the fixed disconnect contact of contact 1*c* receiving the pulse B and thus prevents further advance of pulse B. At the same time, the pulse B is transmitted from a branch of wire 10 to contact 4*c* of relay 4 and, since the latter is energized, the pulse travels over the connecting side of contact 4*c* to the disconnect side of contact 3*b* of relay 3. Since the relay 3 is deenergized, the pulse B halts at the disconnect side of contact 3*b*. The pulse B also passes from the wire 10 to the closed connecting side of contact 6*c* and, through the latter, to the broken connecting side of the contact 5*c* so that further advance of pulse B is then interrupted. From the last branch of the wire 10 the pulse B passes to the contact 8*c*, and through the connecting side of the latter to the connecting side of the contact 7*c* which is open, as the relay 7 is not energized, so that further advance of pulse B is there interrupted. The pulse B is also transmitted by the wire 24 from the lower order presuming that no transfer occurred in the lower order, that is, that the sum of the digit in this lower order did not exceed the value 9, and passes, by way of the disconnecting side of contact 7*d* to the closed connecting side of the contact 8*e* and hence to the relay 15 for energizing the latter. Moreover, the pulse B passes from the wire 24′ by way of the connecting side of contact 8*d* of energized relay 8, to the disconnect side of contact 7*c* of deenergized relay 7, and further, on the one hand, to the contact 5*d* and through its disconnecting side to the disconnecting side of the contact 6*e* of relay 6 which is energized, thereby to prevent further travel of pulse B, and, on the other hand, through the connect side of contact 6*d* to the disconnect side of contact 5*c* and from the latter to the contact 4*d* of energized relay 4. From the spring of contact 4*d*, the pulse passes through the disconnect side of contact 3*d* and is interrupted at the disconnecting side of the contact 4*e* of the relay 4 which is energized. The pulse B also passes from the connecting side of contact 4*d* to the contact 3*c* and, on the one hand, through the branch to the contact 1*d* of energized relay 1 and by way of its connecting side to the disconnect side of contact 2*e* of deenergized relay 2, thus energizing the relay 12 and, on the other hand, through the disconnect side of contact 2*d* of deenergized relay 2 on to the connect side of contact 1*e* of energized relay 1, and hence into the wire 24 extending to a unit corresponding to the next higher order.

Thus, the pulse B energized the relays 12 and 15, with the numerical significance of 8 and 1, such relays being held in their energized condition by the pulse *b* from wire 16. If now a pulse A passes from the wire 18 through the described electric network associated with the group of the relays 11 to 15, it will be seen that the pulse A passes over the disconnect side of contact 13*e* through the closed contact 12*c* and, by way of the disconnect side of contact 11*e*, through the disconnect side of contact 13*d* to contact 20*e* of relay 20. The pulse A also travels from the line 18 through the connect side of contact 15*b* of energized relay 15 to the disconnect side of contact 14*c* and thence through the connect side of contact 15*c* and the disconnect side of contact 11*d* to the disconnect side of contact 13*c* which is engaged by the related spring connected to contact 20*d*, so that the pulse A arrives at the latter. Further, the pulse A passes from the disconnect side of contact 14*c* through the disconnect side of contact 11*b* of deenergized relay 11, and from the spring of contact 11*b* to the contact 20*c* of relay 20. Finally, the pulse A also travels from line 18 over closed contact 15*e* of energized relay 15 to the contact 20*b* of relay 20. Thus, the pulse A is transmitted to the springs of contacts 20*b*, 20*c*, 20*d* and 20*e* of relay 20 which signifies in the code 8, 4, −2, −1 the correct sum 9.

Considering the same example, that is, the addition of 8 and 1 but assuming a transfer from the unit corresponding to the next lower order, that is, a pulse B in the wire 25, it will be seen that, as in the previously described example, the pulse A in a selected wire of line 19′ energizes relay 1 which corresponds to the digit "8" and a pulse A in selected wires of line 17 energizes relays 4, 6 and 8 which, in accordance with the 8, 4, −2, −1 code, indicate the digit "1."

When relays 1, 4, 6 and 8 are simultaneously energized, as above, and held in energized condition by a pulse *a* from wire 9, a pulse B transmitted to the contacts 2*c*, 4*c*, 6*c* and 8*c* from the wire 10 is interrupted at the disconnect side of contact 1*c*, at the disconnect side of contact 3*b*, at the connect side of contact 5*c*, and at the connect side of contact 7*c*, respectively.

The pulse B is also received through wire 25′ from the unit corresponding to the next lower order, and passes from wire 25′ to the springs or movable contacts of contacts 8*b* and 7*e*. The pulse B passes through the closed connect side of contact 8*b* to the closed disconnect side of contact 7*b* and from the latter to both the contact 6*b* and the contact 5*e*. The pulse B passes from the closed connect side of contact 6*b* to the closed disconnect side of contact 5*b* and from the latter to the contacts 4*b* and 3*e*. The pulse passes from the closed connect side of contact 4*b* to the closed disconnect side of contact 3*b* and, from the latter, to contacts 2*b* and 1*e*. Further, the pulse B passes from the closed disconnect side of contact 2*b* to the closed connect side of contact 1*b* and through the spring of the latter to the wire 25 extending to the unit corresponding to the next higher order to produce a transfer into the latter, since the sum of "8" and "1" and the transfer from the lower order is greater than "9."

The pulse B in line 25 is also transmitted to the actuating winding of relay 11 to energize the latter. The pulse B transmitted to contact 1*e* passes from the closed connect side of the latter to the open connect side of contact 2*e* where the pulse is interrupted. The pulse B transmitted to the contact 3*e* passes from the closed disconnect side of the latter to the closed connect side of contact 4*e* and, from the latter, to the relay 13 for energizing the latter. Similarly, the pulse B transmitted to contact 5*e* passes from the closed disconnect side of contact 5*e* to the closed connect side of contact 6*e* and from the latter to the relay 14 for effecting energization thereof. However, the pulse B brought to contact 7*e* passes from the closed disconnect side of the latter to the open disconnect side of contact 8*e* where the travel of the pulse is interrupted. Thus, the relays 11, 13 and 14 are energized and held in that condition by a pulse *b* from line 16. The energized relays 11, 13 and 14 correspond to the numerical values "16," "−4" and "−2," respectively, and thereby signify the correct numerical result of "10." The result or sum of "10" in the illustrated unit corresponds to a transfer of "1" to the unit corresponding to the next higher order, by the pulse B transmitted through line 25, as described above, and to a showing of "0" at the exit of the illustrated unit. It will be apparent that, when relays 11, 13 and 14 are energized, the pulse A carried by line 18 cannot reach any of the contacts 20*b*, 20*c*, 20*d* and 20*e* of relay 20. Thus, the pulse A in line 18 is halted at the open contact 15*e* of deenergized relay 15, so that the line from wire 18 to contact 20*b* is open or incomplete. The pulse B from wire 18 also passes over the closed disconnect side of contact 15*b* to the closed connect side of contact 14*b* and, from the latter to the open disconnect side of contact 11*b* where the line from wire 18 to contact 20*c* is interrupted. From the closed connect side of contact 14*b*, the pulse B transmitted by wire 18 also passes over the closed disconnect side of contact 15*c*, and through the closed connect side of contact 11*d* to the open disconnect side of contact 13*c* where the line to contact 20*d* is interrupted. It will also be seen that the pulse B from wire 18 passing over the closed connect side of contact 11*e* is prevented from reaching the closed connect side of contact 13*c* at the open disconnect side of contact 14*d*. Further, the pulse B transmitted from line 18 over closed contact 11*c* is prevented from reaching contact 20*e* of relay 20 by the open contact 12*b* interposed between closed contact 11*c* and the closed connect side of contact 13*d*.

The combination of a pulse B transmitted through wire 25 to signify a transfer to the higher order and of an absence of any pulse at the contacts 20*b*, 20*c*, 20*d* and 20*e* of relay 20 to signify zero, correctly represents the sum of "10."

In the above described examples, upon the introduction of a certain number, specifically the digit "8," at one entrance of the adding device and the introduction at the other entrance of the complement of that number, specifically the digit "1," the pulse B did not pass from the wire 10 through the adding circuit to any of the relays 11 to 15 and the latter were not energized from the wire 10. Further, the pulse B from wire 10 did not pass into either of the wires 24 or 25, and the energizing of one or more of the relays 11 to 15 was effected by a pulse B transmitted from one or the other of the wires 24 or 25 of the lower order. This fact is one of the features of the adding device according to the invention.

Now let us consider an example where at the left-hand entrance 19′ there is introduced the number 9 so that the relays 1, 3, 5, 7 are energized and at the right-hand entrance there is introduced the number 4 so that the relay 4 is energized, and a transfer from the lower order is indicated by transmission of a pulse B through the wire 25′ simultaneously with the occurrence of a pulse B in wire 10. From the wire 10, the pulse B is transmitted, by way of the closed connect side of contact 4*c*, the closed connect side of contact 3*b*, the closed disconnect side of contact 2*b* and the closed connect side of contact 1*b*, to the relay 11 and into the transfer wire 25, thus increasing the value of the number in the next higher order. The other branches from wire 10 are open. Through the wire 25 from the lower order, a pulse B is transmitted through the contacts 8*b* and 7*b* and through a branch including the contacts 5*e* and 6*e* to the relay 14 for energizing the latter. The remaining relays are not energized. The energized relays 11 and 14 correspond to the numerical value 16−2=14; and, when a pulse A passes through the wire 18, such pulse A can travel only through the contacts 15*b*, 14*b*, 15*c*, 11*d* and 13*c* to the contact 20*d* of the relay 20 which signifies 4 in the code 8, 4, −2, −1. The pulse B transmitted by the wire 25 adds a unit in the higher order so that the result is correct.

A substantial advantage of the adding device according to Fig. 1 is its simplicity, chiefly owing to the code (cipher) used and to the easy formation of the tens transfer. A further outstanding feature of this adding device is the stabilised zero in the adding machine, which means that a subtraction of two equal numbers gives really zero and not a series of nines at all places of the accumulator, the so-called minus zero, as is the case in many other systems of accumulators.

Let us consider a four-digit accumulator which is illustrated diagrammatically in Fig. 10 and comprises four elements or units of the kind shown in Fig. 1. A fifth element, of more simple construction, for accepting only transfers of tens from the highest digit, has been omitted from Fig. 10. Each element corresponding to a lower order is connected with the next element of a higher order by the wires 24 and 25, and the element of the highest order is connected through the wires 24 and 25 to the element of the lowest order. In order to demonstrate the stabilized zero of an accumulator embodying this invention, for example, as shown in Fig. 10, let it be assumed that the number 9999 is to be subtracted from the number 9999 with the obvious result of 0000. Such subtraction is effected by introducing the number 9 at the right hand entrance of each element through the wire 17 to energize the relays 2, 4, 6 and 8 of the element, and by introducing the complement of 9, that is, 0, at the left hand entrance of each element so that the relays 1, 3, 5 and 7 all remain deenergized.

It will be seen that with relays 2, 4, 6 and 8 energized and relays 1, 3, 5 and 7 deenergized, the pulse B from wire 10 cannot reach either the wire 24 or the wire 25. More specifically, the pulse B from wire 10 passes over the closed connect side of contact 2*c* to the open connect side of contact 1*b* where further travel of the pulse is blocked so that it cannot enter the wire 25 through the spring of contact 1*b*. Although a continuous path exists to the wire 24 from the spring of contact 7*c* to the spring of contact 1*c* by way of the closed connect side of contact 6*d*, the closed disconnect side of contact 5*c*, the closed connect side of contact 4*d*, the closed disconnect side of contact 3*c*, the closed connect side of contact 2*d* and the closed disconnect side of contact 1*c*, it will be seen that the pulse B transmitted from wire 10 to the contacts 6*c* and 8*c* is blocked from entering such continuous path at the open connect sides of the contacts 5*c* and 7*c*, respectively. Similarly, the pulse B transmitted from wire 10 to contacts 2*c* and 4*c* is blocked from entering the above described continuous path to wire 24 at the open disconnect sides of such contacts.

Since the contacts of the relays 1 to 8 of each element of the accumulator are in the condition indicated above, it is apparent that there is no possibility of a pulse B from wire 10 reaching the wires 24 or 25 which lead from each element of a lower order to the adjacent element of a higher order and from the element of the highest order to the element of the lowest order. Thus, referring to Fig. 1, neither of the wires 24′ or 25′ extending from the adjacent element of a lower order will carry a pulse B, so that a pulse B in wire 24′ or in wire 25′ cannot be relied upon to cause energization of any of the relays 11 to 15.

Further, the pulse B transmitted from wire 10 to contact 2*c* is prevented from energizing relay 11 at the open connect side of contact 1*b*, and, similarly, the pulse B transmitted from wire 10 to contact 4*c* is prevented from energizing relay 12 at the open connect side of contact 3*b*. It will also be seen that a pulse B transmitted from wire 10 to contact 6*c* is prevented from reaching relay 13 at the open connect side of contact 5*c* and from reaching relay 14 at the open disconnect side of contact 6*d*. Similarly, a pulse B transmitted from wire 10 to contact 8*c* is prevented from reaching relay 14 at the open connect side of contact 7*c* and from reaching relay 15 at the open disconnect side of contact 8*d*.

Thus, all of the relays 11 to 15 remain deenergized, which signifies the zero result, and a pulse A from wire 18 cannot reach any of the contacts 20*b*, 20*c*, 20*d* or 20*e* of relay 20. More specifically, a pulse A from wire 18 is blocked at open contact 11*c*, at the open connect side of contact 11*e*, at open contact 12*c*, at open contact 15*e*, at the open connect side of contact 14*c*, and at the open connect side of contact 11*b*. Thus, each element of the accumulator will correctly indicate the result of zero when the subtrahend and minuend are identical.

Of course, if the subtrahend and minuend are not identical, for example, as in the case of subtracting 9996 from 9999, the introduction of the numeral 9 and the numeral 3, that is, the complement of the numeral 6, at the right hand and left hand entrances of the element of the lowest order serves to energize the relays 2, 4, 6 and 8 and the relays 3 and 7 of that element. This permits a pulse B from wire 10 to enter wire 25 leading to the element of the next higher order to indicate a transfer and to energize relays 11 and 13 so that a pulse A from wire 18 can pass to contacts 20*c* and 20*d* which, in the code 8, 4, —2, —1, indicate the numeral "2." However, the transfer pulse carried by wire 25 to the element of the next higher order causes the latter to indicate the sum of "9" and "0" and a transfer, that is, "10" or "0" and a transfer through wire 25 to the element of the next higher order. Finally, the element of the highest order sends a transfer pulse B through the wire 25 to the element of the lowest order, thereby to raise the result shown by the latter from "2" to the correct result of "3."

Although a particular embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What is claimed is:

1. In a mathematical digit computer of the described character; the combination of a plurality of units each representing a corresponding denominational order in the computer and each having two entrances for simultaneously receiving digits of two addends, two conductors connected between each unit and the unit representing the next higher denominational order and between the units representing the highest and lowest denominational orders, each of said units including two sets of entrance relays associated with said two entrances, respectively, each set of entrance relays having four relays therein corresponding to the coded values 8, 4, —2 and —1, respectively, so that any numerical value from 1 to 9, inclusive, can be represented by combinations of the coded values of said relays, each of said relays having an energizing winding and a hold winding, means for supplying energizing pulses to the energizing windings of selected relays of said two sets having coded values which combine to represent the numerical value of digits introduced at the related entrances of said unit, means for supplying holding pulses to the hold windings of the energized relays to hold the latter in energized condition, groups of contacts actuated by said entrance relays, electric circuit means having said groups of contacts interposed therein for control by the latter and connected to said two conductors extending from the related unit to the unit of next higher order and to the related unit from the unit of next lower order, means for feeding a reading pulse to said circuit means, said groups of contacts and electric circuit means being arranged so that, when the sum of non-complemental digits introduced at said two entrances is greater than the numerical value 9, an electrical reading pulse indicating a transfer is sent from said means for feeding a reading pulse through one of said two conductors to the unit of next higher denominational order, and, when the sum of non-complemental digits introduced at said two entrances is less than the numerical value 9, an electrical pulse is sent through the other of said two conductors to the unit of next higher denominational order, a result giving section having four outlets corresponding to the coded values 8, 4, —2 and —1, respectively, means for feeding a result giving pulse to said section, actuating means for said result giving section controlled by said electric circuit means so that pulses from said means for feeding a result giving pulse will be sent out of selected outlets of said result giving section having coded values which combine to represent the numerical value of the sum of the digits introduced at said two entrances when a pulse is received through said other conductor from the unit of next lower denominational order, and to represent said sum plus one, when a pulse is received through said one conductor from said unit of next lower denominational order, and means for communicating said outlets with one of said entrances of the related unit so that selected relays of the set of entrance relays associated with said one entrance can be subsequently energized having coded values which combine to represent the numerical value of the digit resulting in the related unit from the previous addition.

2. In a mathematical digital computer of the described character; the combination as in claim 1, further comprising means in said circuit means blocking the sending of pulses through any of said outlets when zeros are introduced at said two entrances and said one conductor from the unit of next lower denominational order is pulse free and when a number and its complement of 9 are introduced at said two entrances and both of said two conductors from the unit of next lower denominational order are pulse free.

3. In a mathematical digital computer of the described character; the combination of a plurality of units each representing a corresponding denominational order in the computer and each having two entrances for simultaneously receiving digits of two addends, two conductors connected between each unit and the unit representing the next higher denominational order and between the units representing the highest and lowest denominational orders, each of said units including two sets of entrance relays associated with said two entrances, respectively, each set of entrance relays having four relays therein corresponding to the coded values 8, 4, —2 and —1, respectively, so that any numerical value from 1 to 9, inclusive, can be represented by combinations of the coded values of said relays, each of said relays having an energizing winding and a hold winding, means for supplying energizing pulses to the energizing windings of selected relays of said two sets having coded values which combine to represent the numerical value of digits introduced at the related entrances of said unit, means for supplying holding pulses to the hold windings of the energized relays to hold the latter in energized condition, groups of contacts actuated by said entrance relays, electric circuit means having said groups of contacts interposed therein for control by the latter and connected to said two conductors extending from the related unit to the unit of next higher denominational order and to the related unit from the unit of next lower denominational order, means for feeding a reading pulse to said electric circuit means, said groups of contacts and electric circuit means being arranged so that, when the sum of non-complemental digits introduced at said two entrances is greater than the numerical value 9, an electrical reading pulse indicating a transfer is sent through one of said two conductors from said means for feeding a reading pulse to the unit of next higher denominational order, and, when the sum of non-complemental digits introduced at said two entrances is less than the numerical value 9, an electrical pulse is sent through the other of said two conductors to the unit of next higher denominational order, each of said units further having five result giving relays corresponding to the coded values 16, 8, —4, —2 and 1, respectively, so that the sum of any two digits introduced at said entrances plus a transfer from the unit of next lower denominational order represented by a pulse carried by said one conductor from the latter can be represented by combinations of the coded values of said result giving relays, said electric circuit means controlling the energization of said result giving relays so that selected result giving relays are energized having combined coded values equal to the numerical value of the sum of the digits introduced at said two entrances of the related unit and of any transfer from the unit of next lower denominational order, result giving circuit means having four outlets corresponding to the coded values 8, 4, —2 and —1, respectively, means for feeding result signifying pulses to said result giving circuit means, contacts interposed in said result giving circuit means and actuated by said result giving relays to control the emission of result signifying pulses from said feeding means through said four outlets so that the combined coded values of the outlets emitting pulses represent the numerical value of the last digit of said sum, and means for communicating said four outlets with one of said entrances of the related unit so that, at the conclusion of an addition operation, the entrance relays associated with said one entrance and having the same coded values as the outlets from which pulses are emitted can be energized to introduce the last digit of the sum of the previous addition operation as one of the addends in a subsequent addition operation.

References Cited in the file of this patent

UNITED STATES PATENTS

| | | |
|---|---|---|
| 2,364,540 | Luhn | Dec. 5, 1944 |
| 2,503,765 | Rajchman et al. | Apr. 11, 1950 |
| 2,570,716 | Rochester | Oct. 9, 1951 |
| 2,571,680 | Carbrey | Oct. 16, 1951 |
| 2,601,281 | Hartley et al. | June 24, 1952 |
| 2,634,052 | Bloch | Apr. 7, 1953 |

OTHER REFERENCES

"Synthesis of Electronic Computing and Control Circuits" (The Staff of the Computation Laboratory), published by Harvard University Press (Cambridge, Mass.), 1951 (page 158, Fig. 12.1 and pages 150–152, Table 11.3).